US011533772B2

(12) United States Patent
Hu et al.

(10) Patent No.: US 11,533,772 B2
(45) Date of Patent: Dec. 20, 2022

(54) TECHNIQUES FOR CONFIGURING BANDWIDTH PARTS FOR MULTIPLE-SUBSCRIPTION COMMUNICATION DEVICES

(71) Applicant: QUALCOMM Incorporated, San Diego, CA (US)

(72) Inventors: Jun Hu, San Diego, CA (US); Qingxin Chen, San Diego, CA (US); Reza Shahidi, San Diego, CA (US); Sivaram Srivenkata Palakodety, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/691,323

(22) Filed: Nov. 21, 2019

(65) Prior Publication Data
US 2020/0170063 A1 May 28, 2020

Related U.S. Application Data

(60) Provisional application No. 62/771,483, filed on Nov. 26, 2018.

(51) Int. Cl.
*H04W 76/16* (2018.01)
*H04W 72/04* (2009.01)
*H04W 72/12* (2009.01)
*H04W 74/08* (2009.01)
*H04W 88/06* (2009.01)

(52) U.S. Cl.
CPC ....... *H04W 76/16* (2018.02); *H04W 72/0453* (2013.01); *H04W 72/1284* (2013.01); *H04W 74/0833* (2013.01); *H04W 88/06* (2013.01)

(58) Field of Classification Search
CPC ............ H04W 76/16; H04W 72/0453; H04W 72/1284; H04W 74/0833; H04W 88/06; H04W 76/25
See application file for complete search history.

(56) References Cited

U.S. PATENT DOCUMENTS

| 2016/0227547 | A1* | 8/2016 | Su ..................... H04W 36/0088 |
| 2016/0316421 | A1* | 10/2016 | Barakam ............... H04W 48/16 |
| 2017/0367125 | A1 | 12/2017 | Krishnamoorthy et al. |
| 2018/0288732 | A1* | 10/2018 | Balasubramaniam ....................... H04W 68/005 |
| 2019/0149380 | A1* | 5/2019 | Babaei .................... H04L 5/001 370/330 |

(Continued)

OTHER PUBLICATIONS

WO 2019128308 A1—(Jul. 4, 2019) (Year: 2019).*

(Continued)

*Primary Examiner* — Ian N Moore
*Assistant Examiner* — Rushil Parimal Sampat
(74) *Attorney, Agent, or Firm* — Yanling Yang

(57) ABSTRACT

Aspects described herein relate to communicating, based on a first subscription, with a first Radio Access Technology (RAT) over a bandwidth part (BWP) in a set of one or more configured BWPs, tuning a transceiver away from the BWP to a second frequency to communicate, based on a second subscription, with a second RAT for a period of time, tuning, after the period of time, the transceiver back to a selected BWP to communicate with the first RAT, and handling BWP parameters during or based on the tune away or tune back.

30 Claims, 6 Drawing Sheets

(56) References Cited

U.S. PATENT DOCUMENTS

| | | | |
|---|---|---|---|
| 2019/0208543 A1* | 7/2019 | Dhanapal | H04W 72/1215 |
| 2020/0245360 A1* | 7/2020 | Xu | H04W 72/1289 |
| 2020/0337069 A1* | 10/2020 | Jiang | H04L 5/0032 |
| 2021/0058957 A1* | 2/2021 | Zhao | H04W 72/1257 |

OTHER PUBLICATIONS

WO 2019076171 A1—(Apr. 25, 2019) (Year: 2019).*
International Search Report and Written Opinion—PCT/US2019/062802—ISA/EPO—Feb. 17, 2020.
Vivo, et al., "Stop BWP Inactivity Timer During the Measurement Gap", 3GPP Draft, R2-1807571, Stop BWP Inactivity Timer During the Measurement Gap, 3rd Generation Partnership Project (3GPP), Mobile Competence Centre, 650, Route Des Lucioles, F-06921 Sophia-Antipolis Ce, vol. RAN WG2, No. Susan, Korea, May 21, 2018-May 25, 2018, May 20, 2018 (May 20, 2018), XP051443932, 3 pages, Retrieved from the Internet: URL: http://www.3gpp.org/ftp/Meetings%5F3GPP%5FSYNC/RAN2/Docs/. [retrieved on May 20, 2018] Section 2.1, p. 1-p. 2.
Vivo: "Switching BWP During Measurement Gap", 3GPP Draft, R2-1804678, Switching BWP During Measurement Gap, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018 (Apr. 14, 2018), XP051428392, 3 pages, Retrieved from the Internet: URL: http://www.3gpp.org/ftp/Meetings%5F3GPP%5FSYNC/RAN2/Docs/. [retrieved on Apr. 14, 2018] Section 2.1, p. 2-p. 2.

* cited by examiner

TECHNIQUES FOR CONFIGURING BANDWIDTH PARTS FOR MULTIPLE-SUBSCRIPTION COMMUNICATION DEVICES

CLAIM OF PRIORITY UNDER 35 U.S.C. § 119

The present Application for Patent claims priority to Provisional Application No. 62/771,483, entitled "TECHNIQUES FOR CONFIGURING BANDWIDTH PARTS FOR MULTIPLE-SUBSCRIPTION COMMUNICATION DEVICES" filed Nov. 26, 2018, which is assigned to the assignee hereof and hereby expressly incorporated by reference herein for all purposes.

BACKGROUND

Aspects of the present disclosure relate generally to wireless communication systems, and more particularly, to configuring and/or utilizing bandwidth parts (BWP) for multiple-subscription devices in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication technologies can configure multiple bandwidth parts for a user equipment (UE) to use in communicating in a wireless network (e.g., with a base station and/or one or more other devices). For example, a connected UE camped on NR can receive a radio resource control (RRC) configuration of less than or equal to four downlink BWPs and less than or equal to four uplink BWPs per carrier (and/or less than or equal to four supplementary uplink BWPs if enabled). In addition, dynamic activation/deactivation of BWPs can be achieved by using downlink control information (DCI) sent with a scheduling grant, or one or more timers (e.g., an inactivity timer). When using DCI, BWP switching is also possible to switch from one configured BWP to another, and/or may be separate for downlink and uplink (e.g., in frequency division duplexing communications). In multiple-subscription devices, however, communicating using one subscription may cause undesirable behavior relating to using or switching BWPs in another subscription.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication at a user equipment (UE) is provided. The method includes communicating, based on a first subscription, with a first Radio Access Technology (RAT) over a bandwidth part (BWP) in a set of one or more configured BWPs, tuning a transceiver away from the BWP to a second frequency to communicate, based on a second subscription, with a second RAT for a period of time, tuning, after the period of time, the transceiver back to a selected BWP to communicate with the first RAT, determining that the set of one or more configured BWPs includes multiple BWPs, and sending, based on the tuning the transceiver back to the selected BWP and on determining that the set of one or more configured BWPs includes multiple BWPs, a scheduling request to the first RAT over the selected BWP to request a scheduling grant from the first RAT.

In another example, a method for wireless communication at a UE is provided. The method includes communicating, based on a first subscription, with a first RAT over a BWP in a set of one or more configured BWPs, tuning a transceiver away from the BWP to a second frequency to communicate, based on a second subscription, with a second RAT for a period of time, maintaining an inactivity timer for the BWP while the transceiver is tuned to the second frequency, and tuning, after the period of time, the transceiver back to the BWP to communicate with the first RAT.

In another example, a method for wireless communication at a UE is provided. The method includes communicating, based on a first subscription, with a first RAT over a BWP in a set of one or more configured BWPs, determining to switch to a different BWP in the set of one or more configured BWPs, tuning, before switching to the different BWP, a transceiver away from the BWP to a second frequency to communicate, based on a second subscription, with a second RAT for a period of time, and tuning, after the period of time, the transceiver to the different BWP to communicate with the first RAT In another example, an apparatus for wireless communication is provided that includes a transceiver, a memory configured to store instructions, and one or more processors communicatively coupled with the transceiver and the memory. The one or more processors are configured to communicate, based on a first subscription, with a first RAT over a BWP in a set of one or more configured BWPs, tune a transceiver away from the BWP to a second frequency to communicate, based on a second subscription, with a second RAT for a period of time, tune, after the period of time, the transceiver back to a selected BWP to communicate with the first RAT, determine that the set of one or more configured BWPs includes multiple BWPs, and send, based on the tuning the transceiver back to the selected BWP and on determining that the set of one or more configured BWPs includes multiple BWPs, a scheduling request to the first RAT over the selected BWP to request a scheduling grant from the first RAT.

In another example, an apparatus for wireless communication is provided that includes a transceiver, a memory configured to store instructions, and, one or more processors communicatively coupled with the transceiver and the memory. The one or more processors are configured to communicate, based on a first subscription, with a first RAT over a BWP in a set of one or more configured BWPs, determine to switch to a different BWP in the set of one or more configured BWPs, tune, before switching to the different BWP, a transceiver away from the BWP to a second frequency to communicate, based on a second subscription, with a second RAT for a period of time, and tune, after the period of time, the transceiver to the different BWP to communicate with the first RAT.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
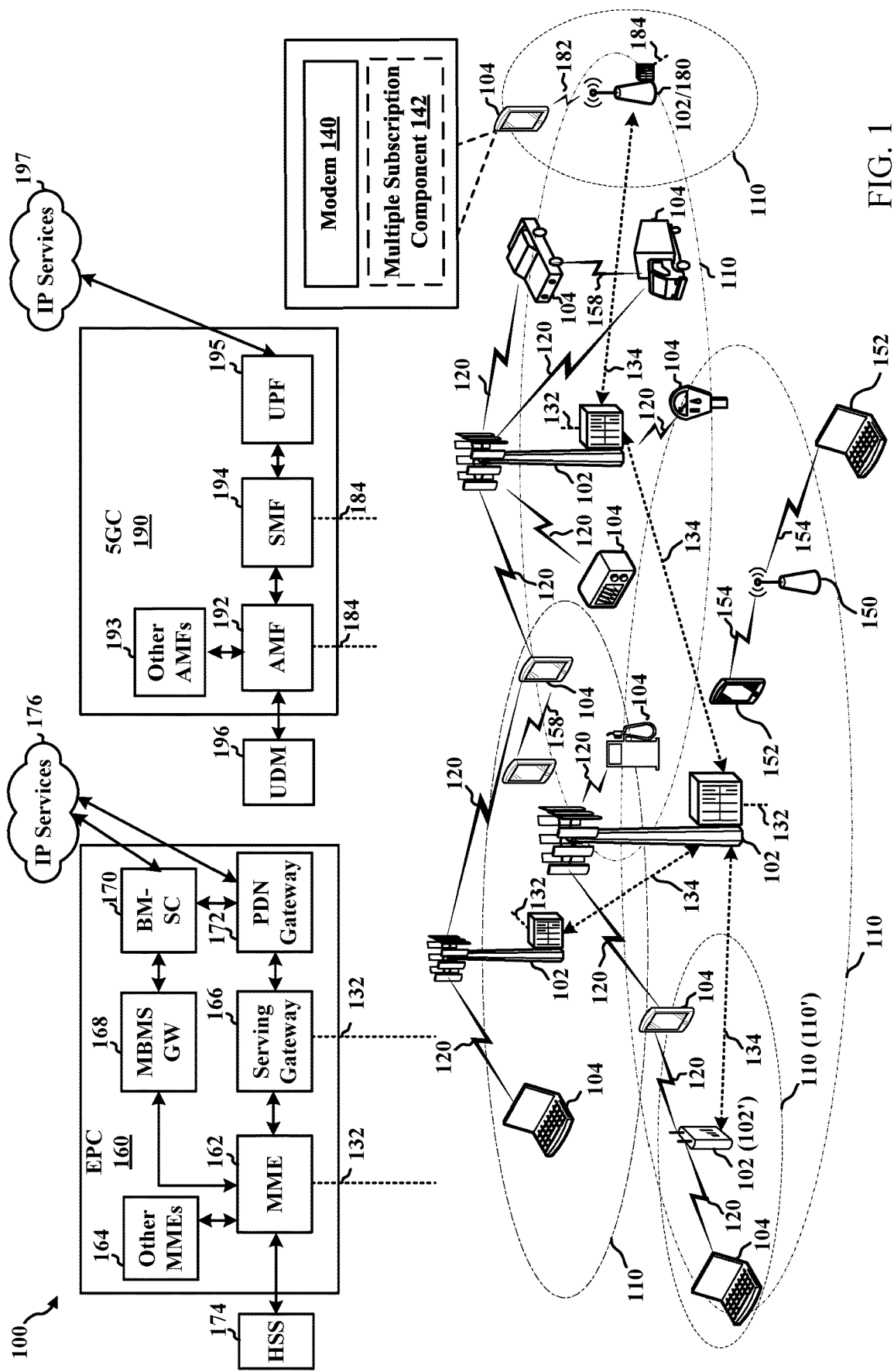
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring one or more parameters to facilitate using multiple bandwidth parts (BWPs) for multiple-subscription devices. For example, multiple-subscription devices can include wireless devices configured to communicate using multiple radio access technologies (RATs) via multiple subscriptions. One example of multiple-subscription devices include dual-subscription dual-standby (DSDS) devices capable of communicating using two subscriptions where one of the two subscriptions can be in a connected mode at a given point in time (e.g., and the other of the two subscriptions can be in idle mode). For example, DSDS devices may primarily be tuned to frequency resources corresponding to a first subscription (e.g., the connected mode subscription), but may be configured to tune away from the first subscription to frequency resources of a second subscription to receive certain signals for the second subscription (e.g., the idle mode subscription), such as paging signals, tracking signals, keep-alive messages, etc. in certain time periods. The tune away can occur in certain configured short periods of time so that the antenna resources of the DSDS device are primarily tuned to the first subscription. Tuning away can refer to tuning transceiver resources of the DSDS device from a frequency associated with the first RAT to a frequency associated with the second RAT such to receive the certain signals, establish communications with the second RAT, and/or the like. The DSDS device can then, after another period of time, tune back to the frequency associated with the first RAT. Though concepts and functionality are generally described herein in terms of DSDS devices, similar concepts and functionality can be used by, applied to, etc. substantially any type of multiple-subscription device.

When a DSDS device, is tuned to the second frequency, however, functionality related to certain aspects of the first subscription may be impacted. In a specific example, tuning away to the second frequency may impact BWP switching with the first RAT. For example, to maintain synchronization with the first RAT, a DSDS device may maintain an inactivity timer related to the first RAT when tuning away to the second RAT. For example, the inactivity timer can track a period of time of inactivity after which the DSDS device can switch from one BWP to a different BWP (e.g., a default BWP). Maintaining the inactivity timer through tune away can allow for a consistent inactivity timer while the DSDS device is communicating using the second subscription and can allow for switching BWP when tuning back if the inactivity timer expires (e.g., during tune away), etc.

In another example, if the DSDS device detects a trigger to switch BWP before tune away and cannot switch the BWP before tune away, the DSDS device can properly handle the BWP switch when tuning back to the first RAT. Moreover, in an example, the DSDS device may miss a BWP switching command from the first RAT when tuned away to the second RAT. In this example, the DSDS device can attempt to detect and/or recover from BWP switching missed during tune away by verifying one or more parameters related to BWPs, transmitting a scheduling request (SR) over the BWP and/or over one or more BWPs in an ordered list of BWPs, etc., as described further herein. In any case, the aspects described herein provide mechanisms that allow for handling BWP switching and/or related parameters through tune away procedures in multiple-subscription devices.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, one or more UEs 104 can be or include a multiple-subscription device, such as a DSDS device. In this example, the UE 104 can include a modem 140 for communicating with one or more base stations and/or other UEs in a wireless network. UE 104 can also include a multiple subscription component 142 for managing communications over multiple subscriptions. In an example, multiple subscription component 142 can additionally manage use of, switching between, etc. BWPs in communicating with one or more RATs using the multiple subscriptions. For example, the DSDS device can have two subscriptions to different RATs and can manage transceiver resources to communicate with both RATs by using tune away mechanisms, as described herein. During or based on the tune away to the second RAT, multiple subscription component 142 can manage parameters related to BWPs, switching of BWPs, etc. related to the first RAT, to allow desired BWP utilizing behavior when tuning back to the first RAT.

Figure 2:
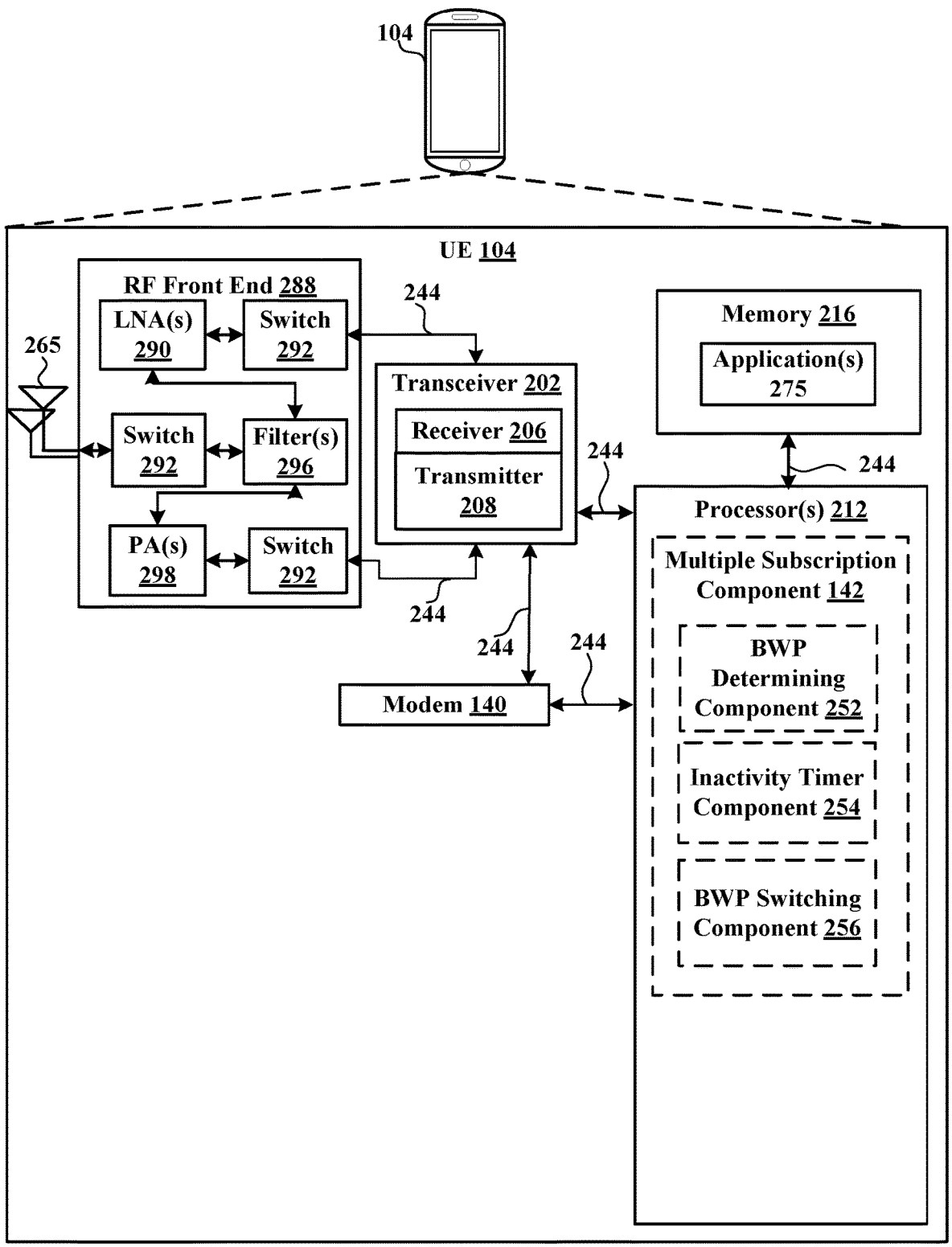
FIG. 2 is a block diagram illustrating an example of a UE, in accordance with various aspects of the present disclosure.
Figure 3:
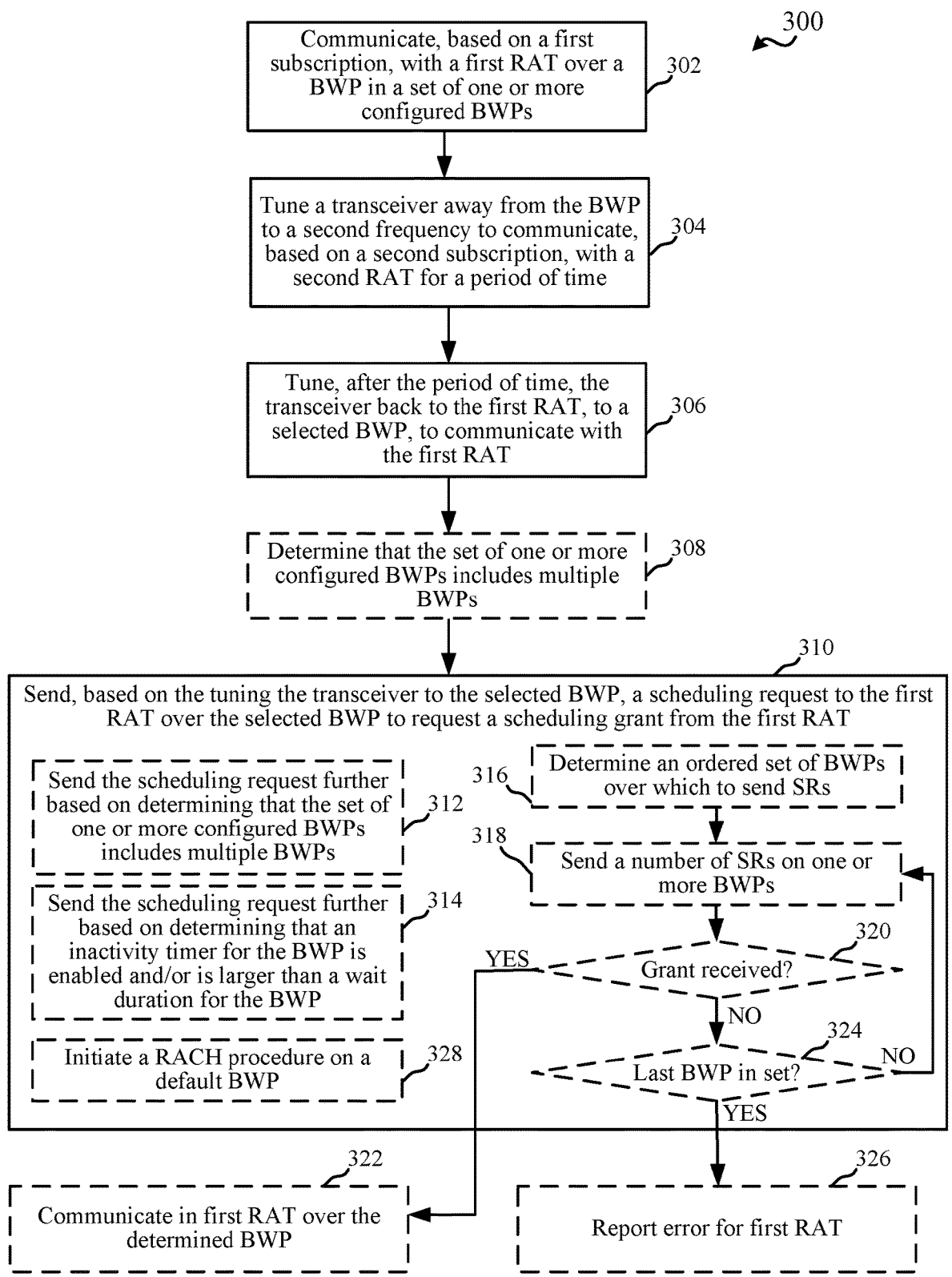
FIG. 3 is a flow chart illustrating an example of a method for selecting a bandwidth part (BWP), in accordance with various aspects of the present disclosure.
Figure 4:
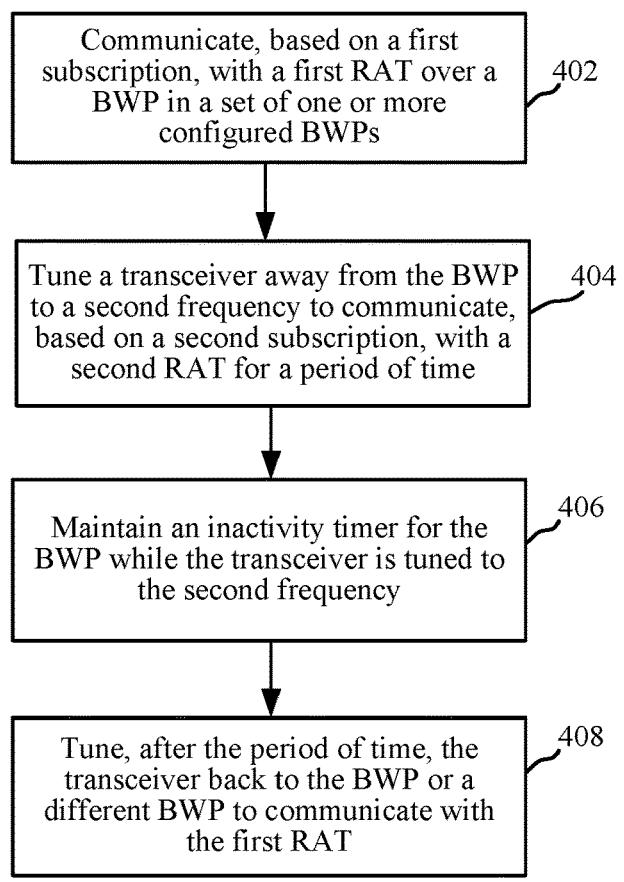
FIG. 4 is a flow chart illustrating an example of a method for maintaining an inactivity timer, in accordance with various aspects of the present disclosure.
Figure 5:
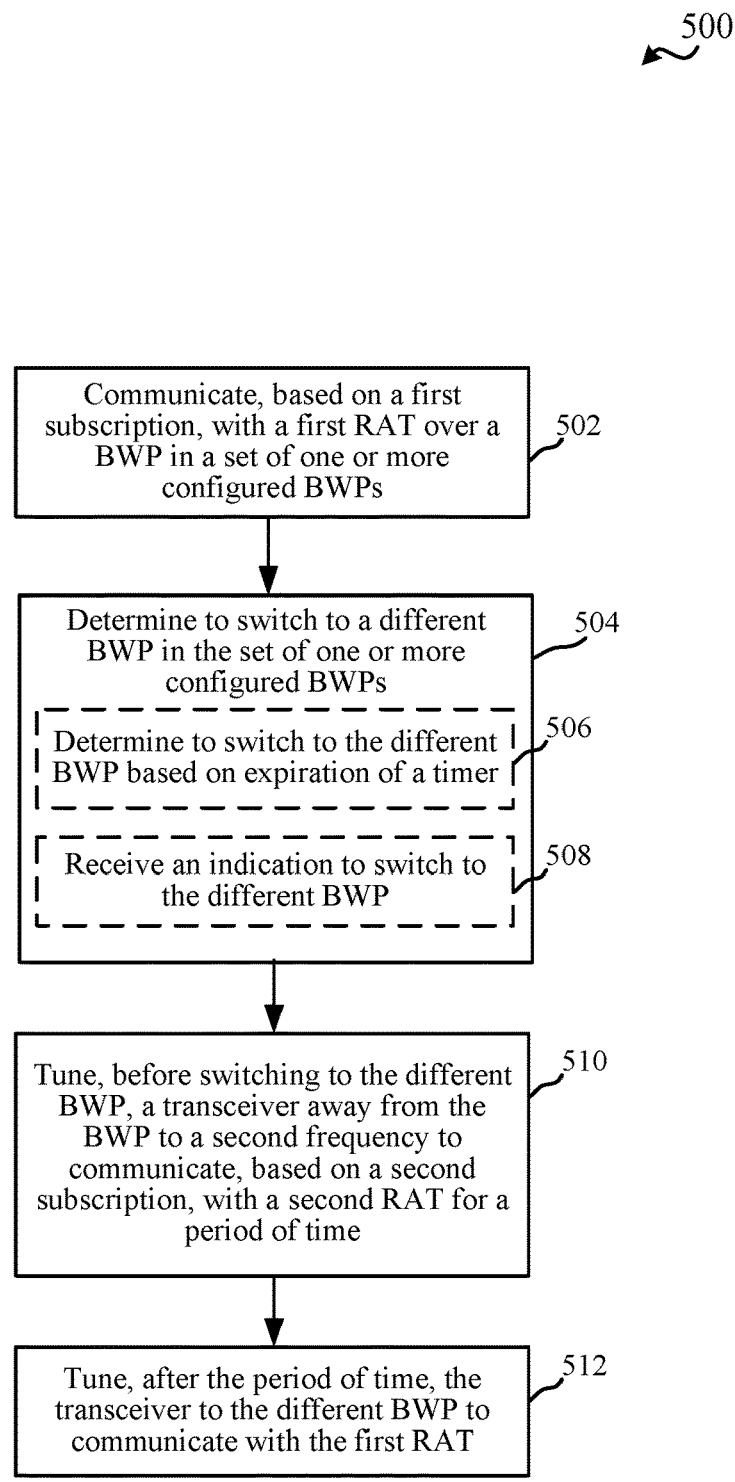
FIG. 5 is a flow chart illustrating an example of a method for switching BWPs, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 3-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 140, and/or a multiple subscription component 142 for managing communications over multiple subscriptions. For example, the multiple subscription component 142 may include managing BWP functions or parameters during or as related to tune away and/or tune back operations, as described, according to one or more of the functions described herein.

In an aspect, the one or more processors 212 can include a modem 140 and/or can be part of the modem 140 that uses one or more modem processors. Thus, the various functions related to a multiple subscription component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with a multiple subscription component 142 may be performed by transceiver 202.

Also, memory 216 may be configured to store data used herein and/or local versions of applications 275 or a multiple subscription component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining a multiple subscription component 142 and/or one or more of its subcomponents, and/or data associated therewith, when UE 104 is operating at least one processor 212 to execute a multiple subscription component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, a multiple subscription component 142 can optionally include a BWP determining component 252 for determining a BWP to use in a first RAT when tuning back from communications with a second RAT, an inactivity timer component 254 for managing an inactivity timer associated with switching BWPs in the first RAT following a detected period of inactivity at the UE 104, and/or a BWP switching component 256 for switching among multiple BWPs based on one or more detected conditions and/or managing BWP switching when the UE 104 is tuned back to the first RAT.

In an aspect, the processor(s) 212 may correspond to one or more of the processors described in connection with the UE in FIG. 6. Similarly, the memory 216 may correspond to the memory described in connection with the UE in FIG. 6.

FIG. 3 illustrates a flow chart of an example of a method 300 for determining a BWP over which to communicate using a first RAT after tuning back from a second RAT. In an example, a UE 104 can perform the functions described in method 300 using one or more of the components described in FIGS. 1-2, such as a multiple subscription component 142 and/or its subcomponents.

In method 300, at Block 302, a first RAT can be communicated with, based on a first subscription, over a BWP in a set of one or more configured BWPs. In an aspect, BWP determining component 252, e.g., in conjunction with processor(s) 212, memory 216, transceiver 202, multiple subscription component 142, etc., can communicate, based on the first subscription, with the first RAT over the BWP in the set of one or more configured BWPs. For example, the UE 104 may be a multiple-subscription device, such as a DSDS device, capable of concurrently managing multiple subscriptions and/or communications using the multiple subscriptions. In this example, multiple subscription component 142 can establish communications with multiple RATs each based on one of multiple subscriptions.

In one example, UE 104 can include multiple subscriber identity modules (SIMs) including subscription information for each of multiple RATs, and the multiple subscription component 142 can facilitate establishing connections with one or more RATs (e.g., which may include establishing connections with one or more base stations providing the one or more RATs). As described, for example, where UE 104 is a DSDS device, multiple subscription component 142 can manage two subscriptions (e.g., via two SIMs), and may do so by allowing one active mode connection at a time, where the other connection is in idle mode and can be tuned away to in short time periods in an attempt to receive paging signals or other information related to the idle mode subscription, etc.

In addition, as part of UE 104 communicating with a first RAT via multiple subscription component 142, BWP determining component 252 can receive a configuration set of multiple BWPs over which the UE 104 can communicate using the first RAT. In an example, the configuration may specify an initial and/or a default BWP in the set, and the multiple subscription component 142 can establish a connection with the first RAT based on the initial or default BWP. For example, the BWPs can correspond to portions of bandwidth assignable in a wireless communication technology, such as portions of frequency in a system bandwidth, which may correspond to a channel for wireless communications with a base station, other devices, etc. In an example, the BWPs can each be associated with a bandwidth and a center frequency, which can vary among BWPs in the set.

In one specific example, for a connected UE 104 that is camped on NR as the first RAT, BWP determining component 252 can receive a configuration (e.g., an RRC configuration from a base station corresponding to the first subscription) indicating a number of downlink (DL) BWP (which can be <=4) and a number of uplink (UL) BWP (which can be <=4) per carrier (and/or a number of BWP for supplemental UL (SUL) as well if enabled, which can also be <=4). In addition, BWP determining component 252 can receive DCI (e.g., from the base station) for dynamic activation/deactivation of BWP. The dynamic activation/deactivation may include BWP switching from one BWP to any configured BWP in the configured set, separate switching of DL and UL BWP (e.g., for FDD), etc. In addition, for example, DCI for activating/deactivating a BWP may be sent with a scheduling grant (e.g., DCI format 1-1 and 0-1)). In another example, dynamic activation/deactivation of BWP can be achieved via a timer, such as using an inactivity timer managed by inactivity timer component 254 (e.g., which may cause BWP switching to default/initial BWP upon inactivity timer expiry).

In method 300, at Block 304, a transceiver can be tuned away from the BWP to a second frequency to communicate, based on a second subscription, with a second RAT for a period of time. In an aspect, multiple subscription component 142, e.g., in conjunction with processor(s) 212, memory 216, transceiver 202, etc., can tune the transceiver (e.g., transceiver 202) away from the BWP to a second frequency to communicate, based on the second subscription, with the second RAT for a period of time. For example, the multiple subscription component 142 can tune the transceiver 202 to a different serving frequency associated with the second RAT (e.g., a BWP configured for the second RAT or other serving frequency) for the period of time. For example, the period of time may be defined by the first RAT and/or the second RAT and/or by the UE 104 to indicate a time during which the UE 104 is allowed to listen on a frequency of the second RAT instead of the first RAT (e.g., for paging signals or other information). In one example, the first RAT and/or second RAT can be aware of the tune away time such that the first RAT can avoid transmitting to the UE 104 during the tune away, the second RAT can transmit signals during the tune away, etc.

In method 300, at Block 306, after the period of time, the transceiver can be tuned back to the first RAT, to a selected BWP, to communicate with the first RAT. In an aspect, BWP determining component 252, e.g., in conjunction with processor(s) 212, memory 216, transceiver 202, multiple subscription component 142, etc., can select the BWP, and multiple subscription component 142 can tune, after the period of time, the transceiver (e.g., transceiver 202) back to the first RAT, to the selected BWP, to communicate with (e.g., using) the first RAT. For example, the selected BWP can include the BWP from which the transceiver 202 was switched (e.g., tuned away from) to communicate with the second RAT (e.g., at Block 304), a configured or determined default or initial BWP, etc. As described, further herein one or more of the BWPs in the set of configured BWPs can be ordered and/or evaluated to determine which BWP to select for tuning back from the second RAT to the first RAT.

As described, for example, BWP usage/switching may be impacted by tune away in the multiple-subscription configuration. For example, during tune away, the multiple subscription component 142 may miss a command from the first RAT to switch BWP (e.g., as part of receiving DCI from the first RAT). In the case of frequent tune away, a multiple-subscription device can have a much higher chance of missing BWP switching compared to a single-subscription device. Recovery from missing the BWP switching can take time and the impact to data throughput may be significant. Accordingly, in some examples, BWP determining component 252 can determine which BWP to select for communicating with the base station following tune away, as described herein.

In one example, in determining the BWP for selecting for tuning back to the first RAT, optionally at Block 308, it can be determined that the set of one or more configured BWPs includes multiple BWPs. In an aspect, BWP determining component 252, e.g., in conjunction with processor(s) 212, memory 216, transceiver 202, multiple subscription component 142, etc., can determine that the set of one or more configured BWPs includes multiple BWPs. For example, where the set includes only one BWP, multiple subscription component 142 can tune back to this one BWP when tuning back from the second RAT. Where there are multiple BWPs in the set, however, a selection of the BWP to use for tuning back from the second RAT may be defined. In one example, the selection may be initiated as the last BWP used before tuning away from the first RAT to the second RAT. As described further herein, other BWPs may be selected based on receiving BWP switching commands, detecting expiration of the inactivity timer, etc.

In method 300, at Block 310, a SR can be sent, based on tuning the transceiver to the selected BWP, to the first RAT over the selected BWP to request a scheduling grant from the first RAT. In an aspect, BWP determining component 252, e.g., in conjunction with processor(s) 212, memory 216, transceiver 202, multiple subscription component 142, etc., can send, based on the tuning the transceiver (e.g., transceiver 202) to the selected BWP, the SR to the first RAT over the selected BWP to request the scheduling grant from the first RAT. For example, BWP determining component 252 can transmit the SR over an uplink control channel (e.g., physical uplink control channel (PUCCH)) in a corresponding UL BWP to request the scheduling grant from the base station 102. In an example, the base station 102 can transmit the scheduling grant to the UE 104 over a downlink control channel (e.g., physical downlink control channel (PDCCH)) in the corresponding DL BWP.

In one example, in sending the SR at Block 310, optionally at Block 312, the SR can be sent further based on determining that the set of one or more configured BWPs includes multiple BWPs. In an aspect, BWP determining component 252, e.g., in conjunction with processor(s) 212, memory 216, transceiver 202, multiple subscription component 142, etc., can send the SR further based on determining that the set of one or more configured BWPs includes multiple BWPs. For example, where only one BWP is configured in the set, this may imply that a BWP switching event is not missed, and thus this single BWP in the set can be selected.

In another example, in sending the SR at Block 310, optionally at Block 314, the SR can be sent further based on determining that an inactivity timer for the BWP is enabled and/or is larger than a wait duration for the BWP. In an aspect, inactivity timer component 254, e.g., in conjunction with processor(s) 212, memory 216, transceiver 202, multiple subscription component 142, etc., can maintain an inactivity timer, as described above, and BWP determining component 252 can send the SR further based on determining that the inactivity timer for the BWP is enabled and/or is larger than a wait duration for the BWP. For example, BWP determining component 252 can maintain a timer for the BWP wait duration, which can define an amount of time to wait to receive a scheduling grant in response to a SR before sending another SR or taking other action. In this example, if the inactivity timer has a larger duration, this may indicate that the BWP wait duration does not expire before the inactivity timer, and thus BWP selecting process can be performed to send at least one SR and possibly receive a response before the inactivity timer expires. If the inactivity timer has a duration less than or equal to that of the BWP wait duration, BWP determining component 252 may not have time to send a SR and wait for a scheduling grant before the inactivity timer expires, and thus multiple subscription component 142 can select the previously used BWP for communicating using the first RAT. Otherwise, BWP determining component 252 can determine the BWP to select for communicating using the first RAT as described herein.

In an example, in sending the SR at Block 310, optionally, at Block 316, an ordered set of BWPs over which to send SRs can be determined. In an aspect, BWP determining component 252, e.g., in conjunction with processor(s) 212, memory 216, transceiver 202, multiple subscription component 142, etc., can determine the ordered set of BWPs over which to send SRs. For example, BWP determining component 252 may determine the ordered set of BWPs based on determining which BWP is used most (e.g., has the highest activity level) in communicating with the first RAT (e.g., by the UE 104). For example, BWP determining component 252 may track BWPs used in communicating with the first RAT, as described further herein, and may apply a filter to determine the ordered set of BWPs. In another example, BWP determining component 252 can determine the ordered set of BWPs by determining an order of last usage (e.g., a distance in time from the last usage) or other past history of usage. In this example, the first BWP in the list can be the most recently used, the second one is the one used before the first one, and so on. In any case, BWP determining component 252 may send the number of SRs by cycling through the ordered set of BWPs to send the number of SRs for each BWP in the set until a scheduling grant is received.

In another example, in sending the SR at Block 310, optionally at Block 318, a number of SRs can be sent on one or more BWPs. In an aspect, BWP determining component 252, e.g., in conjunction with processor(s) 212, memory 216, transceiver 202, multiple subscription component 142, etc., can send the number of SRs on the one or more BWPs. For example, BWP determining component 252 can send the number of SRs until a scheduling grant is received, and/or may send the SRs on different BWPs in a set (whether ordered at Block 316 or not), as described further herein. For example, if no grant is received after the number of SRs, BWP determining component 252 can select a next BWP from the set of configured BWPs and transmit a number of SRs until a scheduling grant is received or the number of SRs are sent, and so on. In one example, BWP determining component 252 can continue sending SRs until a threshold total number of SRs has been reached or until a timer expires without receiving a scheduling grant. For example, this timer may be initialized when the first SR is sent.

For example, in sending the SR at Block 310, optionally at Block 320, it can be determined whether a grant is received. In an aspect, BWP determining component 252, e.g., in conjunction with processor(s) 212, memory 216, transceiver 202, multiple subscription component 142, etc., can determine whether a grant is received. For example, BWP determining component 252 can determine whether a resource grant is received over or for the BWP on which the SR is sent (or which is related to the BWP over which the SR is sent). For example, the grant may be sent by the base station 102 using DCI and/or the like, as described above.

If the grant is received at Block 320, optionally at Block 322, the first RAT can be communicated in over the determined BWP. In an aspect, multiple subscription component 142, e.g., in conjunction with processor(s) 212, memory 216, transceiver 202, etc., can communicate in the first RAT over the determined BWP. In this regard, for example, multiple subscription component 142 can tune the transceiver 202 to the determined BWP for primarily communicating in the first RAT (which may include allowing tune away to the second RAT, as described above).

If the grant is not received at Block 320, optionally at Block 324, it can be determined whether the BWP is a last BWP in a set of BWPs. In an aspect, BWP determining component 252, e.g., in conjunction with processor(s) 212, memory 216, transceiver 202, multiple subscription component 142, etc., can determine whether the BWP is the last BWP in the set of BWPs (e.g., an ordered set as determined in Block 316 or another ordered or unordered set determined to be configured for the first RAT, as described above). If not, the method 300 can proceed to Block 318 to send a number of SRs on a different BWP in the set. In one example, this may include sending the SR on a next BWP in a set defined for both uplink and downlink communications (e.g., in TDD), a next BWP in a set defined for uplink communications and/or as corresponding to a different BWP in a set defined for downlink communications (e.g., in FDD), etc., as described herein.

If the BWP is the last BWP in the set at Block 324, optionally at Block 326, an error can be reported for the first RAT. In an aspect, multiple subscription component 142, e.g., in conjunction with processor(s) 212, memory 216, transceiver 202, etc., can report the error for the first RAT. This may include reporting radio link failure (RLF), initializing a RLF timer, etc., and/or may include switching to the second RAT for service, and/or the like.

In another example, where a scheduling grant is not received and/or once the timer for sending SRs expires, sending the SR at Block 310 may further optionally include, at Block 328, initiating a RACH procedure on a default BWP. In an aspect, BWP determining component 252, e.g., in conjunction with processor(s) 212, memory 216, transceiver 202, multiple subscription component 142, etc., can initiate the RACH procedure on the default (or initial) BWP. In this regard, BWP determining component 252 can reestablish the connection with the first RAT for tuning back to the first RAT where the sending of one or more SRs fails at Block 310. In one example, though not shown, this may be additionally or alternatively performed where it is determined that the BWP is the last BWP in the set at Block 324. Moreover, in an example, BWP determining component 252 can initiate the RACH procedure on the default BWP where an inactivity timer expires, where an early exit timer expires, etc., as described further herein.

In addition, where a scheduling grant is received on a BWP, BWP determining component 252 can select the BWP, and multiple subscription component 142 can communicate with the first RAT using the selected BWP, as described above. In an example, this may include selecting the BWP for DL and/or UL communications (e.g., where the BWPs can be separately selected in FDD).

In a specific example, BWP determining component 252 can perform the following process when tuning back to the first RAT at Block 306, determining a set of one or more configured BWPs at Block 308, sending the SR(s) at Block 310, and/or the like. In the specific example, BWP determining component 252 can determine whether RRC configured less than or equal to (<=) 1 BWP configuration, and if so can use this BWP in attempting tune back to the first RAT. If not, BWP determining component 252 can determine if the inactivity timer managed by inactivity timer component 254 is enabled and configured to be <=a BWP wait duration, which can be a configurable parameter as described above, and if so can use the last used BWP from the first RAT in attempting tune back to the first RAT. If not, for each tune back, BWP determining component 252 can send SR a number of times (e.g., up to 3 times) over the selected BWP (e.g., the last used BWP in the first RAT) and monitor PDCCH for the BWP wait duration (e.g., and/or if DRX enabled, during ON period). When a PDCCH with a scheduling grant or a PDCCH order is received, or where the inactivity timer is expired before a scheduling grant or PDCCH order is received, or where an early exit timer specified for the BWP selection is expired before a scheduling grant or PDCCH order is received, BWP determining component 252 can stop monitoring PDCCHs and can select the default or initial BWP for tuning back to the first RAT. For example, the inactivity timer can be initialized and/or reset when scheduling grants and/or other communications are received from a base station over the frequency resources of the BWP.

In any case, if no response to SR is received (e.g., at least within a threshold period of time, which can be based on one or more of the configured timers described above or otherwise), the last used BWP can be considered out of synchronization. In this case, for each BWP configuration, ii, in an ordered set of BWP configurations (e.g., excluding the last used BWP), BWP determining component 252 can switch to BWP ii, send SR a number of times on the BWP and monitor PDCCH on the BWP for the BWP wait duration (e.g., and/or if DRX enabled, during ON period). For FDD communications, for each BWP configuration ii, BWP determining component 252 can also run through each UL BWP configuration jj, and can switch to DL BWP ii and UL BWP jj, send the SR a number of times on the UL BWP and monitor PDCCH on the DL BWP. In either case where, for a given BWP (or combination of DL BWP and UL BWP in FDD) a PDCCH with scheduling grant or a PDCCH order is received, or the inactivity timer is expired, or the early exit timer expired, BWP determining component 252 can stop monitoring PDCCHs and can select the default or initial BWP for tuning back to the first RAT. In one example, where the BWP determining component 252 switches to the default or initial BWP, BWP determining component 252 can initiate RACH procedures with the first RAT with the default or initial BWP.

In a specific example, BWP determining component 252 can order the set of configured BWPs based on the following process, and can order BWPs for DL and UL separately for FDD (e.g., as described in connection with Block 316 above). Where the inactivity timer is greater than the BWP wait duration, where a new connection is set up, or where the numerology changes on a primary component carrier (PCC), a BWP scan set can be initialized with the BWPs that are configured for PCC and have the same numerology as the current active BWP on PCC. The BWP scan set can be initially ordered based on a BWP based on the BWP index configured for the BWP. For each slot k, BWP determining component 252 can run a filter for each BWP configuration n in the BWP scan set based on the following:

$$\text{FilteredBWP}[n][k]=(\text{BWP\_In}[n][k]+(TC\_BWP-1)*\text{FilteredBWP}[k-1])/TC\_BWP$$

where BWP_In[n][k]=1 if this BWP is the active BWP and 0 otherwise. TC_BWP can be a configurable parameter. FilteredBWP[n][0]=BWP_In[n][0] and progressive before k=TC_BWP. BWP determining component 252 can reorder the BWP scan set in descending order based on FilteredBWP values (and/or if the values are the same, based on BWP index).

FIG. 4 illustrates a flow chart of an example of a method 400 for maintaining an inactivity timer for a first RAT during tune away to a second RAT. In an example, a UE 104 can perform the functions described in method 400 using one or more of the components described in FIGS. 1-2, such as multiple subscription component 142 and/or its subcomponents.

In method 400, at Block 402, a first RAT can be communicated with, based on a first subscription, over a BWP in a set of one or more configured BWPs. In an aspect, BWP determining component 252, e.g., in conjunction with processor(s) 212, memory 216, transceiver 202, multiple subscription component 142, etc., can communicate, based on the first subscription, with the first RAT over the BWP in the set of one or more configured BWPs, as described above, e.g., in Block 302 of method 300 (FIG. 3).

In method 400, at Block 404, a transceiver can be tuned away from the BWP to a second frequency to communicate, based on a second subscription, with a second RAT for a period of time. In an aspect, multiple subscription component 142, e.g., in conjunction with processor(s) 212, memory 216, transceiver 202, etc., can tune the transceiver (e.g., transceiver 202) away from the BWP to a second frequency to communicate, based on the second subscription, with the second RAT for a period of time, as described above, e.g., in Block 304 of method 300 (FIG. 3).

In method 400, at Block 406, an inactivity timer can be maintained for the BWP while the transceiver is tuned to the second frequency. In an aspect, inactivity timer component 254, e.g., in conjunction with processor(s) 212, memory 216, transceiver 202, multiple subscription component 142, etc., can maintain the inactivity timer for the BWP while the transceiver is tuned to the second frequency. For example, inactivity timer component 254 can initialize an inactivity timer when communicating with the first RAT, and can begin the timer when inactivity is detected in communicating with the first RAT. For example, inactivity timer component 254 can initialize or reset the inactivity timer after receiving a scheduling grant or other communications associated with the first RAT and over frequency resources of the BWP, such that when activity is detected, inactivity timer component 254 can reset the timer. In an example, inactivity timer component 254 can initialize and/or reset the inactivity timer to a value that is received in a configuration (e.g., from the base station 102). In any case, time spent tuned to the second RAT can be time that the UE 104 is inactive with respect to the first RAT, and thus inactivity timer component 254 can maintain the inactivity timer to continue tolling for the BWP of the first RAT during the tune away. Inactivity timer component 254 can maintain the inactivity timer by continuing to toll the timer through the tune away or by adjusting (e.g., as part of tuning back) the inactivity timer based on the amount of time elapsed during the tune away.

When the inactivity timer expires, the BWP may be switched, as described above. In one example, this can occur during tune away, in which case the BWP can be selected as described with reference to FIG. 3 above (e.g., in returning to the first RAT after tune away). In another example, this can occur when the UE 104 is communicating using the first RAT, in which case the multiple subscription component 142 can switch BWPs, as described above. In yet another example, this can occur when the UE 104 is communicating using the first RAT, but may not have enough time to switch the BWP before a tune away, in which case the BWP switching can be delayed (e.g., until the first RAT is tuned back to after tune away), as described further herein.

In any case, in method 400, at Block 408, after the period of time, the transceiver can be tuned back to the BWP or a different BWP to communicate with the first RAT. In an aspect, multiple subscription component 142, e.g., in conjunction with processor(s) 212, memory 216, transceiver 202, etc., can tune, after the period of time, the transceiver (e.g., transceiver 202) back to the BWP or a different BWP to communicate with the first RAT. The inactivity timer component 254 can continue maintaining the inactivity timer while communicating using the BWP. For example, where the inactivity timer expires during tune away, as described above, in one example, multiple subscription component 142 can tune to a default or initial BWP, and/or initiate a RACH procedure, etc. In another example, multiple subscription component 142, as part of tuning back to the first RAT, may perform a BWP selection procedure, as described above in reference to FIG. 3.

FIG. 5 illustrates a flow chart of an example of a method 500 for switching BWP after tune away. In an example, a UE 104 can perform the functions described in method 500 using one or more of the components described in FIGS. 1-2, such as multiple subscription component 142 and/or its subcomponents.

In method 500, at Block 502, a first RAT can be communicated with, based on a first subscription, over a BWP in a set of one or more configured BWPs. In an aspect, BWP determining component 252, e.g., in conjunction with processor(s) 212, memory 216, transceiver 202, multiple subscription component 142, etc., can communicate, based on the first subscription, with the first RAT over the BWP in the set of one or more configured BWPs, as described above, e.g., in Block 302 of method 300 (FIG. 3).

In method 500, at Block 504, it can be determined to switch to a different BWP in the set of one or more configured BWPs. In an aspect, BWP switching component 256, e.g., in conjunction with processor(s) 212, memory 216, transceiver 202, multiple subscription component 142, etc., can determine to switch to the different BWP in the set of the one or more configured BWPs. In an example, BWP switching component 256 can determine to switch to the different BWP without having enough time to switch before a tune away by the multiple subscription component 142. In an example, BWP switching component 256 may determine that there is not enough time based at least in part on determining that a time until tune away is to occur is less than a threshold time related to BWP switching.

In an example, in determining to switch to the different BWP at Block 504, optionally at Block 506, it can be determined to switch to the different BWP based on expiration of a timer. In an aspect, BWP switching component 256, e.g., in conjunction with processor(s) 212, memory 216, transceiver 202, multiple subscription component 142, etc., can determine to switch to the different BWP based on expiration of the timer. For example, the timer can correspond to the inactivity timer managed by inactivity timer component 254. For example, after expiration of the inactivity timer, BWP switching component 256 can determine to switch to a default or initial BWP, but BWP switching component 256 can determine that there is not enough time to switch BWP before the tune away.

In another example, in determining to switch to the different BWP at Block 504, optionally at Block 508, an indication to switch to the different BWP can be received. In an aspect, BWP switching component 256, e.g., in conjunction with processor(s) 212, memory 216, transceiver 202, multiple subscription component 142, etc., can receive the indication to switch to the different BWP. For example, the base station 102 may instruct the UE 104 to switch to the different BWP for communicating with the base station 102 at least for a period of time and/or until the inactivity timer or another timer expires. In this example, BWP switching component 256 can determine to switch to the different BWP based on receiving the indication. In addition, in this example, inactivity timer component 254 can enable the inactivity timer as if the BWP switch was performed. In either case, as described, BWP switching component 256 can determine there is not enough time to switch BWP before the tune away.

Thus, in method 500, at Block 510, a transceiver can be tuned away, before switching the BWP, from the BWP to a second frequency to communicate, based on a second subscription, with a second RAT for a period of time. In an aspect, multiple subscription component 142, e.g., in conjunction with processor(s) 212, memory 216, transceiver 202, etc., can tune, before switching to the different BWP, the transceiver (e.g., transceiver 202) away from the BWP to a second frequency to communicate, based on the second subscription, with the second RAT for a period of time, as described above.

In method 500, at Block 512, after the period of time, the transceiver can be tuned to the different BWP to communicate with the first RAT. In an aspect, multiple subscription component 142, e.g., in conjunction with processor(s) 212, memory 216, transceiver 202, etc., can tune, after the period of time, the transceiver (e.g., transceiver 202) to the different BWP to communicate with the first RAT. For example, BWP switching component 256 can switch to the different BWP determined in Block 504 as part of tuning back to the first RAT. In one example, where determining to switch the BWP is based on an expired inactivity timer, BWP switching component 256 can switch the BWP to the default or initial BWP as part of tuning back to the first RAT. In another example, where determining to switch the BWP is based on a received indication, if the inactivity timer is enabled, inactivity timer can start, as described above, while tuned away and BWP switching component 256 can switch to the different BWP when tuning back to the first RAT. When tuning back to the first RAT, however, if the inactivity timer is expired, BWP switching component 256 can switch to the default or initial BWP. Where the inactivity timer is not expired, BWP switching component 256 can switch to the different BWP received in the indication (e.g., at Block 508). Moreover, in an example, where switching to the different BWP is not the correct BWP (e.g., where multiple subscription component 142 determines that communications are not received over the different BWP within a threshold period of time), BWP switching component 252 can perform a BWP selection procedure, as described above in FIG. 3, can switch to the default or initial BWP and initiate a RACH procedure, etc.

Figure 6:
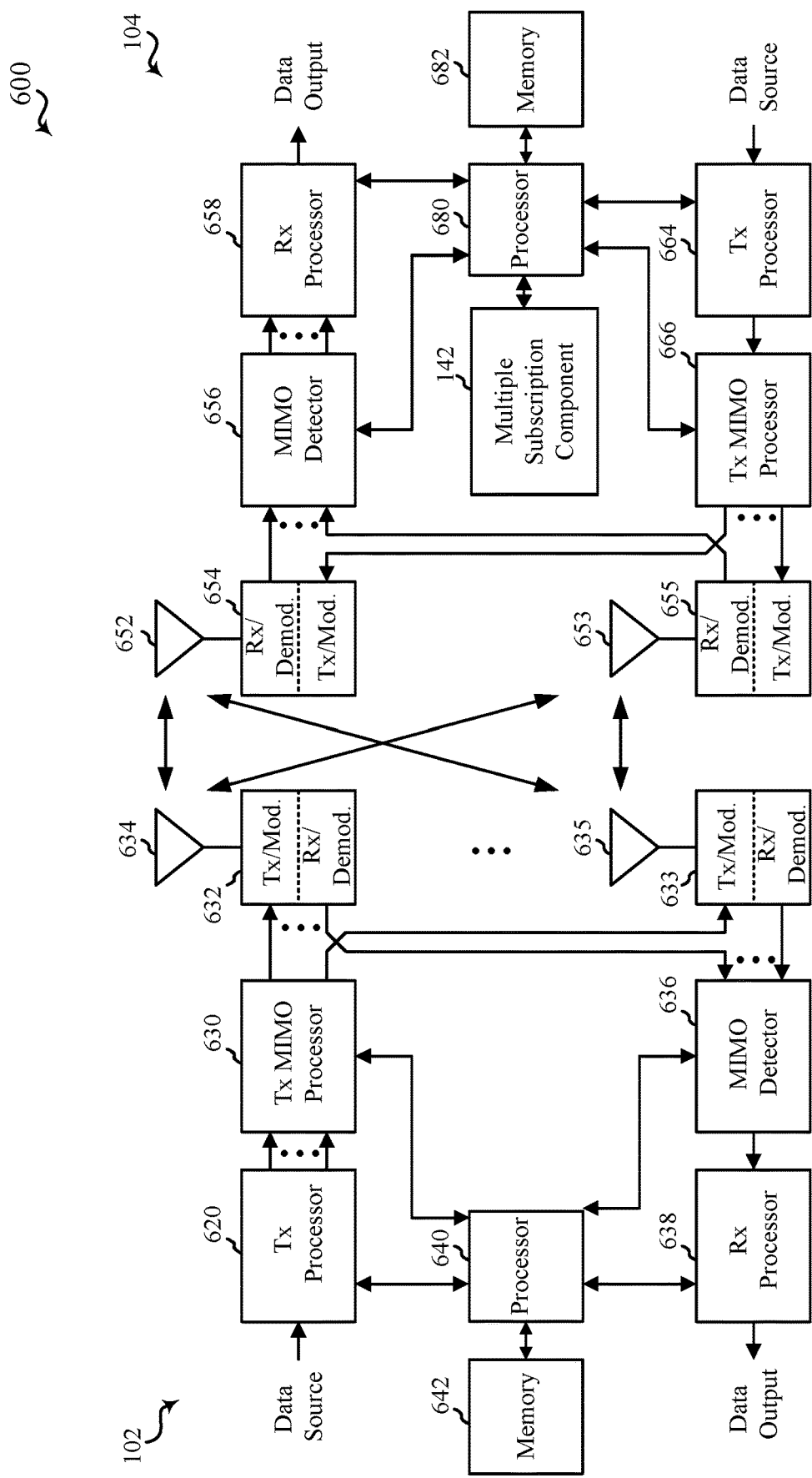
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a multiple subscription component 142 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication at a User Equipment (UE), comprising:

communicating, based on a first subscription, with a first Radio Access Technology (RAT) over a bandwidth part (BWP) in a set of one or more configured BWPs;

tuning a transceiver away from the BWP to a second frequency to communicate, based on a second subscription, with a second RAT for a period of time;

tuning, after the period of time, the transceiver back to a selected BWP to communicate with the first RAT;

determining that the set of one or more configured BWPs includes multiple BWPs; and sending, based on the tuning the transceiver back to the selected BWP and on determining that the set of one or more configured BWPs includes multiple BWPs, a scheduling request to the first RAT over the selected BWP to request a scheduling grant from the first RAT.

2. The method of example 1, wherein sending the scheduling request is further based at least in part on determining that an inactivity timer for the BWP is enabled and is configured to be larger than a wait duration for the BWP.

3. The method of any of examples 1 or 2, wherein sending the scheduling request comprises sending a number of scheduling requests to request the scheduling grant, wherein each of the number of scheduling requests is sent based on determining that a response is not received within one or more threshold time periods.

4. The method of example 3, further comprising:

determining, based on sending the number of scheduling requests without receiving the response within the one or more threshold time periods, an ordering of the set of one or more configured BWPs; and for at least a first BWP in the ordering of the set of one or more configured BWPs, sending a subsequent scheduling request to the first RAT over at least the first BWP to request the scheduling grant from the first RAT.

5. The method of example 4, further comprising for at least a second BWP in the ordering of the set of one or more configured BWPs that is next in order following at least the first BWP, and based on not receiving the scheduling grant in response to the subsequent scheduling request, sending a second subsequent scheduling request to the first RAT over at least the second BWP to request the scheduling grant from the first RAT.

6. The method of any of examples 4 or 5, wherein sending the subsequent scheduling request comprises sending a number of subsequent scheduling requests to request the scheduling grant, wherein each of the number of subsequent scheduling requests is sent based on determining that a response is not received within one or more subsequent threshold time periods.

7. The method of example 6, further comprising:

tuning, based on sending the number of subsequent scheduling requests for each BWP in the ordering of the set of one or more configured BWPs without receiving the response within the one or more subsequent threshold time periods, to a configured default BWP; and initiating a random access channel (RACH) procedure with the first RAT over the configured default BWP.

8. The method of any of examples 4 to 7, wherein the one or more threshold time periods include an inactivity timer for the BWP, a wait duration for the BWP, and an upper time limit since tuning back from the second RAT.

9. The method of any of examples 4 to 8, wherein determining the ordering of the set of one or more configured BWPs comprises determining the ordering based on determining an activity level or last usage for each BWP in the set of one or more configured BWPs.

10. The method of any of examples 1 to 9, further comprising maintaining an inactivity timer for the BWP while the transceiver is tuned to the second frequency.

11. The method of example 10, wherein maintaining the inactivity timer comprises adjusting the inactivity timer based on an elapsed time after the transceiver is tuned back to the BWP.

12. A method for wireless communication at a UE, comprising:

communicating, based on a first subscription, with a first Radio Access Technology (RAT) over a bandwidth part (BWP) in a set of one or more configured BWPs;

determining to switch to a different BWP in the set of one or more configured BWPs;

tuning, before switching to the different BWP, a transceiver away from the BWP to a second frequency to communicate, based on a second subscription, with a second RAT for a period of time; and tuning, after the period of time, the transceiver to the different BWP to communicate with the first RAT.

13. The method of example 12, wherein determining to switch to the different BWP comprises determining to switch to a default BWP where an inactivity timer expires before or during tuning the transceiver away from the BWP.

14. The method of any of examples 12 or 13, wherein determining to switch to the different BWP comprises receiving an indication to switch to the different BWP before tuning the transceiver away from the BWP.

15. The method of example 14, further comprising initializing an inactivity timer before tuning the transceiver away from the BWP.

16. The method of example 15, wherein tuning the transceiver to the different BWP comprises determining to switch to a default BWP where the inactivity timer expires before or during tuning the transceiver away from the BWP.

17. The method of any of examples 15 or 16, wherein tuning the transceiver to the different BWP is based at least in part on determining that the inactivity timer did not expire.

18. An apparatus for wireless communication, comprising:

a transceiver;

a memory configured to store instructions; and one or more processors communicatively coupled with the transceiver and the memory, wherein the one or more processors are configured to:

communicate, based on a first subscription, with a first Radio Access Technology (RAT) over a bandwidth part (BWP) in a set of one or more configured BWPs;

tune a transceiver away from the BWP to a second frequency to communicate, based on a second subscription, with a second RAT for a period of time;

tune, after the period of time, the transceiver back to a selected BWP to communicate with the first RAT;

determine that the set of one or more configured BWPs includes multiple BWPs; and send, based on the tuning the transceiver back to the selected BWP and on determining that the set of one or more configured BWPs includes multiple BWPs, a scheduling request to the first RAT over the selected BWP to request a scheduling grant from the first RAT.

19. The apparatus of example 18, wherein the one or more processors are configured to send the scheduling request further based at least in part on determining that an inactivity timer for the BWP is enabled and is configured to be larger than a wait duration for the BWP.

20. The apparatus of any of examples 18 or 19, wherein the one or more processors are configured to send a number of scheduling requests to request the scheduling grant, wherein each of the number of scheduling requests is sent based on determining that a response is not received within one or more threshold time periods.

21. The apparatus of example 20, wherein the one or more processors are further configured to:

determine, based on sending the number of scheduling requests without receiving the response within the one or more threshold time periods, an ordering of the set of one or more configured BWPs; and for at least a first BWP in the ordering of the set of one or more configured BWPs, send a subsequent scheduling request to the first RAT over at least the first BWP to request the scheduling grant from the first RAT.

22. The apparatus of example 21, wherein the one or more processors are configured to, for at least a second BWP in the ordering of the set of one or more configured BWPs that is next in order following at least the first BWP, and based on not receiving the scheduling grant in response to the subsequent scheduling request, send a second subsequent scheduling request to the first RAT over at least the second BWP to request the scheduling grant from the first RAT.

23. The apparatus of any of examples 21 or 22, wherein the one or more processors are configured to send a number of subsequent scheduling requests to request the scheduling grant, wherein each of the number of subsequent scheduling requests is sent based on determining that a response is not received within one or more subsequent threshold time periods.

24. The apparatus of example 23, wherein the one or more processors are further configured to:

tune, based on sending the number of subsequent scheduling requests for each BWP in the ordering of the set of one or more configured BWPs without receiving the response within the one or more subsequent threshold time periods, to a configured default BWP; and initiate a random access channel (RACH) procedure with the first RAT over the configured default BWP.

25. The apparatus of any of examples 21 to 24, wherein the one or more threshold time periods include an inactivity timer for the BWP, a wait duration for the BWP, and an upper time limit since tuning back from the second RAT.

26. The apparatus of any of examples 21 to 25, wherein the one or more processors are configured to determine the ordering of the set of one or more configured BWPs based on determining an activity level or last usage for each BWP in the set of one or more configured BWPs.

27. The apparatus of any of examples 17 to 26, wherein the one or more processors are further configured to maintain an inactivity timer for the BWP while the transceiver is tuned to the second frequency.

28. The apparatus of example 27, wherein the one or more processors are configured to maintain the inactivity timer at least in part by adjusting the inactivity timer based on an elapsed time after the transceiver is tuned back to the BWP.

29. An apparatus for wireless communication, comprising:

a transceiver;

a memory configured to store instructions; and one or more processors communicatively coupled with the transceiver and the memory, wherein the one or more processors are configured to:

communicate, based on a first subscription, with a first Radio Access Technology (RAT) over a bandwidth part (BWP) in a set of one or more configured BWPs;

determine to switch to a different BWP in the set of one or more configured BWPs;

tune, before switching to the different BWP, a transceiver away from the BWP to a second frequency to communicate, based on a second subscription, with a second RAT for a period of time; and tune, after the period of time, the transceiver to the different BWP to communicate with the first RAT.

30. The apparatus of example 29, wherein the one or more processors are configured to determine to switch to a default BWP where an inactivity timer expires before or during tuning the transceiver away from the BWP.

What is claimed is:

1. A method for wireless communication at a User Equipment (UE), comprising:

communicating, based on a first subscription, with a first Radio Access Technology (RAT) over a bandwidth part (BWP) in a set of one or more configured BWPs;

temporarily tuning a transceiver away from the BWP to a second frequency to communicate, based on a second subscription, with a second RAT for a period of time as part of a dual subscription dual standby (DSDS), wherein the period of time is configured for the DSDS;

tuning, after the period of time, the transceiver from the second frequency to a selected BWP to communicate with the first RAT as part of the DSDS; and sending, based on the tuning the transceiver from the second frequency to the selected BWP as part of the DSDS and where the set of one or more configured BWPs includes multiple BWPs, a scheduling request to the first RAT over the selected BWP to request a scheduling grant from the first RAT.

2. The method of claim 1, wherein sending the scheduling request is further based at least in part on determining that an inactivity timer for the BWP is enabled and is configured to be larger than a wait duration for the BWP.

3. The method of claim 1, wherein sending the scheduling request comprises sending a number of scheduling requests to request the scheduling grant, wherein each of the number of scheduling requests is sent based on determining that a response is not received within one or more threshold time periods.

4. The method of claim 3, further comprising:

determining, based on sending the number of scheduling requests without receiving the response within the one or more threshold time periods, an ordering of the set of one or more configured BWPs; and for at least a first BWP in the ordering of the set of one or more configured BWPs, sending a subsequent scheduling request to the first RAT over at least the first BWP to request the scheduling grant from the first RAT.

5. The method of claim 4, further comprising for at least a second BWP in the ordering of the set of one or more configured BWPs that is next in order following at least the first BWP, and based on not receiving the scheduling grant in response to the subsequent scheduling request, sending a second subsequent scheduling request to the first RAT over at least the second BWP to request the scheduling grant from the first RAT.

6. The method of claim 4, wherein sending the subsequent scheduling request comprises sending a number of subsequent scheduling requests to request the scheduling grant, wherein each of the number of subsequent scheduling requests is sent based on determining that a response is not received within one or more subsequent threshold time periods.

7. The method of claim 6, further comprising:
tuning, based on sending the number of subsequent scheduling requests for each BWP in the ordering of the set of one or more configured BWPs without receiving the response within the one or more subsequent threshold time periods, to a configured default BWP; and
initiating a random access channel (RACH) procedure with the first RAT over the configured default BWP.

8. The method of claim 4, wherein the one or more threshold time periods include an inactivity timer for the BWP, a wait duration for the BWP, and an upper time limit since tuning back from the second RAT.

9. The method of claim 4, wherein determining the ordering of the set of one or more configured BWPs comprises determining the ordering based on determining an activity level or last usage for each BWP in the set of one or more configured BWPs.

10. The method of claim 1, further comprising maintaining an inactivity timer for the BWP while the transceiver is tuned to the second frequency.

11. The method of claim 10, wherein maintaining the inactivity timer comprises adjusting the inactivity timer based on an elapsed time after the transceiver is tuned back to the BWP.

12. A method for wireless communication at a UE, comprising:
communicating, based on a first subscription, with a first Radio Access Technology (RAT) over a bandwidth part (BWP) in a set of one or more configured BWPs;
determining to switch to a different BWP in the set of one or more configured BWPs;
tuning, before switching to the different BWP, a transceiver away from the BWP to a second frequency to communicate, based on a second subscription, with a second RAT for a period of time as part of a dual subscription dual standby (DSDS), wherein the period of time is configured for the DSDS; and
tuning, after the period of time, the transceiver from the second frequency to the different BWP to communicate with the first RAT as part of the DSDS.

13. The method of claim 12, wherein determining to switch to the different BWP comprises determining to switch to a default BWP where an inactivity timer expires before or during tuning the transceiver away from the BWP.

14. The method of claim 12, wherein determining to switch to the different BWP comprises receiving an indication to switch to the different BWP before tuning the transceiver away from the BWP.

15. The method of claim 14, further comprising initializing an inactivity timer before tuning the transceiver away from the BWP.

16. The method of claim 15, wherein tuning the transceiver to the different BWP comprises determining to switch to a default BWP where the inactivity timer expires before or during tuning the transceiver away from the BWP.

17. The method of claim 15, wherein tuning the transceiver to the different BWP is based at least in part on determining that the inactivity timer did not expire.

18. An apparatus for wireless communication, comprising:
a transceiver;
a memory configured to store instructions; and
one or more processors communicatively coupled with the transceiver and the memory, wherein the one or more processors are configured to:
communicate, based on a first subscription, with a first Radio Access Technology (RAT) over a bandwidth part (BWP) in a set of one or more configured BWPs;
temporarily tune a transceiver away from the BWP to a second frequency to communicate, based on a second subscription, with a second RAT for a period of time as part of a dual subscription dual standby (DSDS), wherein the period of time is configured for the DSDS;
tune, after the period of time, the transceiver from the second frequency to a selected BWP to communicate with the first RAT as part of the DSDS; and
send, based on the tuning the transceiver from the second frequency to the selected BWP as part of the DSDS and where the set of one or more configured BWPs includes multiple BWPs, a scheduling request to the first RAT over the selected BWP to request a scheduling grant from the first RAT.

19. The apparatus of claim 18, wherein the one or more processors are configured to send the scheduling request further based at least in part on determining that an inactivity timer for the BWP is enabled and is configured to be larger than a wait duration for the BWP.

20. The apparatus of claim 18, wherein the one or more processors are configured to send a number of scheduling requests to request the scheduling grant, wherein each of the number of scheduling requests is sent based on determining that a response is not received within one or more threshold time periods.

21. The apparatus of claim 20, wherein the one or more processors are further configured to:
determine, based on sending the number of scheduling requests without receiving the response within the one or more threshold time periods, an ordering of the set of one or more configured BWPs; and
for at least a first BWP in the ordering of the set of one or more configured BWPs, send a subsequent scheduling request to the first RAT over at least the first BWP to request the scheduling grant from the first RAT.

22. The apparatus of claim 21, wherein the one or more processors are configured to, for at least a second BWP in the ordering of the set of one or more configured BWPs that is next in order following at least the first BWP, and based on not receiving the scheduling grant in response to the subsequent scheduling request, send a second subsequent scheduling request to the first RAT over at least the second BWP to request the scheduling grant from the first RAT.

23. The apparatus of claim 21, wherein the one or more processors are configured to send a number of subsequent scheduling requests to request the scheduling grant, wherein each of the number of subsequent scheduling requests is sent based on determining that a response is not received within one or more subsequent threshold time periods.

24. The apparatus of claim 23, wherein the one or more processors are further configured to:
tune, based on sending the number of subsequent scheduling requests for each BWP in the ordering of the set of one or more configured BWPs without receiving the response within the one or more subsequent threshold time periods, to a configured default BWP; and
initiate a random access channel (RACH) procedure with the first RAT over the configured default BWP.

25. The apparatus of claim 21, wherein the one or more threshold time periods include an inactivity timer for the BWP, a wait duration for the BWP, and an upper time limit since tuning back from the second RAT.

26. The apparatus of claim 21, wherein the one or more processors are configured to determine the ordering of the set of one or more configured BWPs based on determining an activity level or last usage for each BWP in the set of one or more configured BWPs.

27. The apparatus of claim 18, wherein the one or more processors are further configured to maintain an inactivity timer for the BWP while the transceiver is tuned to the second frequency.

28. The apparatus of claim 27, wherein the one or more processors are configured to maintain the inactivity timer at least in part by adjusting the inactivity timer based on an elapsed time after the transceiver is tuned back to the BWP.

29. An apparatus for wireless communication, comprising:
- a transceiver;
- a memory configured to store instructions; and
- one or more processors communicatively coupled with the transceiver and the memory, wherein the one or more processors are configured to:
  - communicate, based on a first subscription, with a first Radio Access Technology (RAT) over a bandwidth part (BWP) in a set of one or more configured BWPs;
  - determine to switch to a different BWP in the set of one or more configured BWPs;
  - tune, before switching to the different BWP, a transceiver away from the BWP to a second frequency to communicate, based on a second subscription, with a second RAT for a period of time as part of a dual subscription dual standby (DSDS), wherein the period of time is configured for the DSDS; and
  - tune, after the period of time, the transceiver from the second frequency to the different BWP to communicate with the first RAT as part of the DSDS.

30. The apparatus of claim 29, wherein the one or more processors are configured to determine to switch to a default BWP where an inactivity timer expires before or during tuning the transceiver away from the BWP.

\* \* \* \* \*